US010728272B1

(12) United States Patent
Ranjha et al.

(10) Patent No.: US 10,728,272 B1
(45) Date of Patent: Jul. 28, 2020

(54) RISK SCORING IN A CONNECTED GRAPH

(71) Applicant: Amazon Technologies, Inc., Seattle, WA (US)

(72) Inventors: Danial Muhammad Ranjha, Spokane, WA (US); Jon Arron McClintock, Seattle, WA (US); Tushaar Sethi, Seattle, WA (US); Maarten Van Horenbeeck, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/573,980

(22) Filed: Dec. 17, 2014

(51) Int. Cl.
*G06F 11/00* (2006.01)
*H04L 29/06* (2006.01)
*G06F 21/62* (2013.01)
*G06F 16/901* (2019.01)

(52) U.S. Cl.
CPC ...... *H04L 63/1433* (2013.01); *G06F 16/9024* (2019.01); *G06F 21/6218* (2013.01)

(58) Field of Classification Search
CPC .......... G06F 21/577; G06F 2221/2113; G06F 21/552; G06F 21/6218; H04L 63/1416; H04L 63/1433; H04L 45/128; H04L 63/1441; H04L 12/66; H04L 41/14; H04L 63/1425; H04L 63/1408
See application file for complete search history.

(56) References Cited

U.S. PATENT DOCUMENTS

| | | |
|---|---|---|
| 5,941,947 A | 8/1999 | Brown et al. |
| 6,493,796 B1 | 12/2002 | Arnon et al. |
| 7,596,672 B1 | 9/2009 | Gole et al. |
| 7,712,078 B1 | 5/2010 | Mirchandani |
| 7,774,363 B2 | 8/2010 | Lim |
| 7,869,425 B2 | 1/2011 | Elliott et al. |
| 8,099,760 B2 * | 1/2012 | Cohen ................. H04L 63/1433 726/2 |
| 8,131,281 B1 * | 3/2012 | Hildner ................. H04W 24/00 455/418 |
| 8,307,003 B1 | 11/2012 | Sheth et al. |
| (Continued) | | |

OTHER PUBLICATIONS

Moy, "OSPF Version 2," Request for Comments: 2328, Ascend Communications, Inc, Network Working Group, Category: Standards Track, STD: 54, Obsoletes: 2178, Apr. 1998, 224 pages.

(Continued)

*Primary Examiner* — Farid Homayounmehr
*Assistant Examiner* — Lizbeth Torres-Diaz
(74) *Attorney, Agent, or Firm* — Davis Wright Tremaine LLP

(57) ABSTRACT

A method and apparatus for risk scoring in a graph are disclosed. In the method and apparatus, a graph includes a first node that is connected with a node of a plurality of nodes using a communication link of a plurality of communication links. A plurality of link risk measures are then determined, whereby a link risk measure of the plurality of link risk measures pertains to the communication link of the plurality of communication links. Furthermore, a risk measure associated with the first node is determined based at least in part on the plurality of link risk measures. The risk measure is monitored to determine if one or more conditions placed on the risk measure are met and one or more actions are taken as a result of the one or more conditions being met.

20 Claims, 7 Drawing Sheets

(56) References Cited

U.S. PATENT DOCUMENTS

| | | | |
|---|---|---|---|
| 8,554,912 B1* | 10/2013 | Reeves | G06F 21/552 |
| | | | 709/225 |
| 8,682,942 B1 | 3/2014 | Lee et al. | |
| 8,995,279 B2 | 3/2015 | Massoulie et al. | |
| 8,996,482 B1 | 3/2015 | Singh et al. | |
| 9,240,955 B1* | 1/2016 | Mukhopadhyay | H04L 43/50 |
| 9,294,498 B1* | 3/2016 | Yampolskiy | G06F 21/57 |
| 9,794,130 B2 | 10/2017 | Jenkins et al. | |
| 10,103,851 B2* | 10/2018 | Callaghan | H04L 1/244 |
| 2002/0132667 A1 | 9/2002 | Shoji | |
| 2003/0041180 A1 | 2/2003 | Schlussman | |
| 2003/0195987 A1 | 10/2003 | Krishnamurthy et al. | |
| 2003/0216935 A1* | 11/2003 | Keppens | G06Q 30/016 |
| | | | 705/304 |
| 2004/0076164 A1* | 4/2004 | Vanderveen | H04L 45/28 |
| | | | 370/400 |
| 2004/0122747 A1 | 6/2004 | Jimenez et al. | |
| 2005/0076137 A1 | 4/2005 | Tang et al. | |
| 2005/0132220 A1* | 6/2005 | Chang | G06F 21/6218 |
| | | | 726/4 |
| 2005/0193250 A1* | 9/2005 | Takeuchi | G06F 21/552 |
| | | | 714/15 |
| 2006/0021050 A1* | 1/2006 | Cook | G06F 21/577 |
| | | | 726/25 |
| 2006/0265751 A1* | 11/2006 | Cosquer | H04L 63/1416 |
| | | | 726/25 |
| 2007/0276835 A1 | 11/2007 | Murthy | |
| 2008/0019378 A1 | 1/2008 | Hogan | |
| 2008/0022270 A1 | 1/2008 | Morrow et al. | |
| 2008/0028050 A1 | 1/2008 | Fiducci | |
| 2008/0071728 A1* | 3/2008 | Lim | G06F 21/604 |
| 2008/0208369 A1 | 8/2008 | Grgic et al. | |
| 2008/0208374 A1 | 8/2008 | Grgic et al. | |
| 2008/0212616 A1 | 9/2008 | Augustine et al. | |
| 2008/0320089 A1 | 12/2008 | Jung et al. | |
| 2009/0049220 A1 | 2/2009 | Conti et al. | |
| 2009/0103442 A1* | 4/2009 | Douville | H04L 45/128 |
| | | | 370/248 |
| 2009/0157936 A1 | 6/2009 | Goss et al. | |
| 2009/0228983 A1 | 9/2009 | Qin et al. | |
| 2009/0268606 A1 | 10/2009 | Delew et al. | |
| 2010/0124196 A1* | 5/2010 | Bonar | H04B 7/0689 |
| | | | 370/329 |
| 2010/0128629 A1 | 5/2010 | Sinha et al. | |
| 2010/0128640 A1 | 5/2010 | Okamoto | |
| 2010/0251242 A1 | 9/2010 | Sivasubramanian et al. | |
| 2011/0126197 A1 | 5/2011 | Larsen et al. | |
| 2011/0131656 A1* | 6/2011 | Haviv | G06F 21/566 |
| | | | 726/25 |
| 2011/0231443 A1 | 9/2011 | Hannel et al. | |
| 2011/0277027 A1 | 11/2011 | Hayton et al. | |
| 2012/0192258 A1 | 7/2012 | Spencer et al. | |
| 2012/0203738 A1 | 8/2012 | Aigner et al. | |
| 2012/0255016 A1 | 10/2012 | Sallam | |
| 2013/0111559 A1 | 5/2013 | Lomme et al. | |
| 2013/0117766 A1 | 5/2013 | Bax et al. | |
| 2013/0132854 A1* | 5/2013 | Raleigh | G06F 3/0482 |
| | | | 715/738 |
| 2013/0151388 A1 | 6/2013 | Falkenborg et al. | |
| 2013/0194966 A1* | 8/2013 | Wang | H04L 41/12 |
| | | | 370/254 |
| 2013/0339647 A1* | 12/2013 | Jindo | G06F 3/0617 |
| | | | 711/165 |
| 2014/0046638 A1 | 2/2014 | Peloski | |
| 2014/0214610 A1 | 7/2014 | Moshir et al. | |
| 2015/0058993 A1* | 2/2015 | Choi | H04L 63/1433 |
| | | | 726/25 |
| 2015/0133130 A1 | 5/2015 | Gupta et al. | |
| 2015/0163121 A1 | 6/2015 | Mahaffey et al. | |
| 2015/0205954 A1* | 7/2015 | Jou | G06F 21/316 |
| | | | 726/22 |
| 2018/0041528 A1* | 2/2018 | Machlica | H04L 63/1425 |
| 2018/0219917 A1* | 8/2018 | Chiang | G06Q 10/0635 |
| 2019/0098039 A1* | 3/2019 | Gates | G06N 20/00 |

OTHER PUBLICATIONS

Moy et al., "Lab Course: Router Lab", Open Shortest Path First (OSPF), Networking Group, RFC 2328, STD 54, Apr. 1998, 20 pages.

* cited by examiner

RISK SCORING IN A CONNECTED GRAPH

BACKGROUND

A computing environment may include a large number of connected nodes in a network, whereby a node may be a computer, server, database or computing service, among others. The network may be managed by a service provider that provides off-premises and remotely accessible computing resources to customers of the service provider. Due to the connectivity of the nodes, a risk of a security breach or data exfiltration affecting a node may propagate to other nodes in the network with which the node has a connection. For example, in the event that one node is compromised by an attacker, other nodes in the network with which the node exchanges data may also be compromised by virtue of their connectivity to the compromised node.

It is often challenging to evaluate a risk measure associated with a connected node in a graph of nodes. It is also challenging to evaluate the risk measure by factoring and taking into account risk that is attributable to the node's connectivity with other nodes in a network. It is additionally challenging to take precautionary actions in response to evaluating the risk measure associated with the node.

BRIEF DESCRIPTION OF THE DRAWINGS

Various embodiments in accordance with the present disclosure will be described with reference to the drawings, in which.

DETAILED DESCRIPTION

Figure 1:
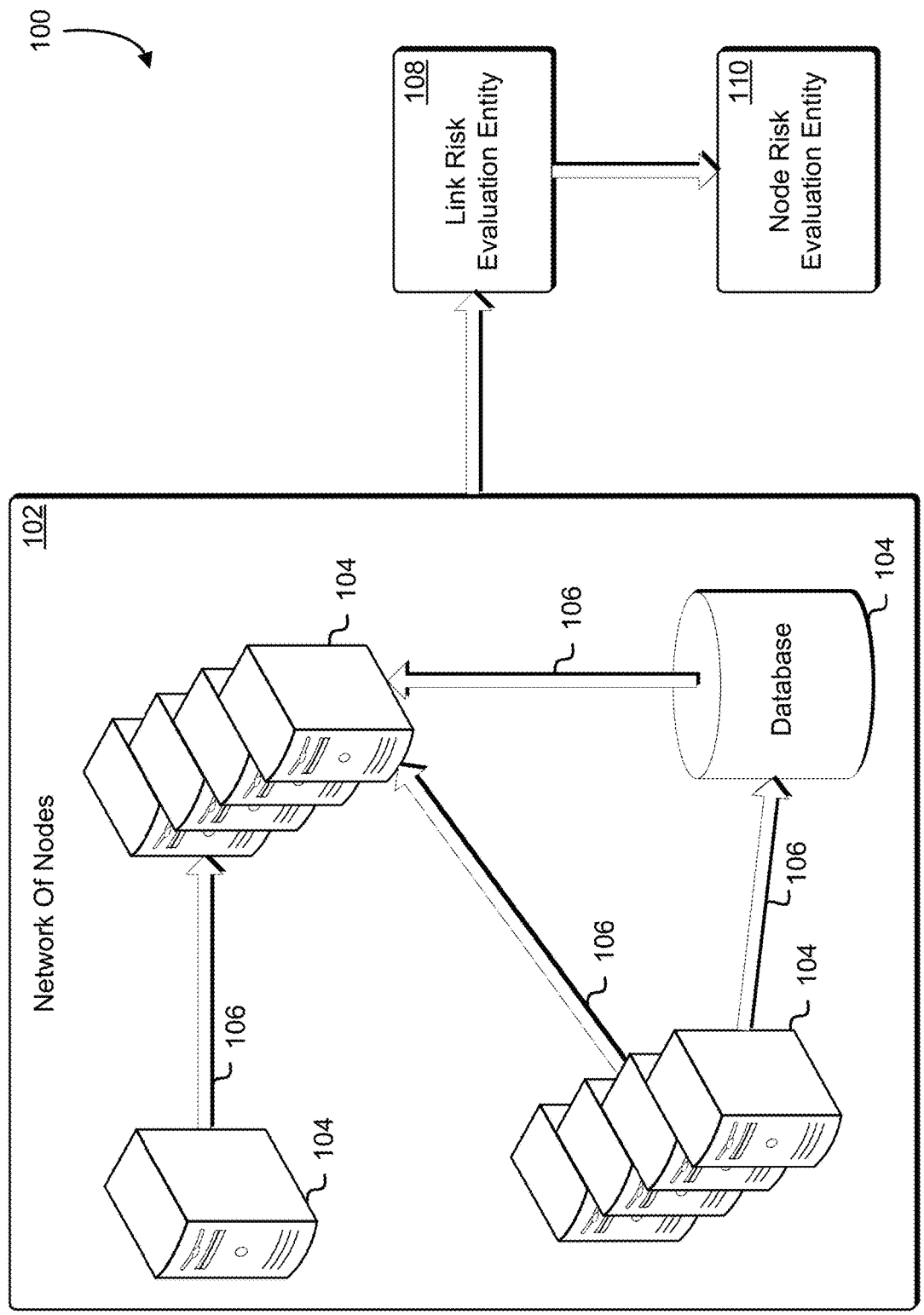
FIG. 1 shows an example of an environment for evaluating a computed risk measure associated with a node of a network in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include evaluating a computed risk measure associated with a connected node in a network of nodes. The node, which may be any type of computing device, such as a server or database, among others, may be connected with other nodes in the network using a number of communication links. The communication links may be used to enable access between the nodes of the network. For example, the communication link may be used by a first node to submit computing requests, such as application programming interface (API) configured web service requests, to a second node. Further, the communication link may be used by the first node to cause data to be stored in the second node, among others.

A node may be associated with a computed risk measure, which may be a risk score including a numeric risk score. The computed risk measure may represent a likelihood of a security breach of the node or compromise of the node. Due to the security breach, an unauthorized user, such as an attacker, may obtain access to the node or data stored in the node may be exfiltrated. The computed risk measure may be determined based at least in part on a number or type of communication links that the node has with other nodes in the network. For example, each communication link that is established with the node may be associated with a link risk measure and the link risk measures of the node's communication links may be used to determine the node's computed risk measure. Accordingly, with factors being equal, a highly connected node may be associated with more risk than a less connected node. That is due to the fact that the highly connected node accumulates more risk due to its connectivity. However, in various circumstances, a node having only one communication link with another node may have a higher computed risk measure than a highly connected node due at least in part to the fact that the other node is associated with a high computed risk measure.

When the computed risk measures associated with nodes in a graph are obtained, the computed risk measures may be evaluated to determine whether one or more conditions on the computed risk measure are met. For example, the one or more conditions may include the computed risk measure being within a specified range of risk measures or exceeding a threshold. If the one or more conditions are met, a party, such as a computing resource service provider managing the network of nodes or an administrator of the node, may take one or more actions to ensure that the network remains secure. For example, an alert may be sent to an administrator of the network indicating that the one or more conditions are met. In addition, the establishment of further communication links with the node may be denied or existing communication links of the node may be terminated to reduce the computed risk measure associated with the node. The actions may also include annotating log entries of the node or auditing log trails of the node. Furthermore, the actions may include locking the node or filtering access to the node.

In the network of nodes (also referred to herein as a graph), the communication links of the network may be traversed on a periodic basis or according to a schedule to identify the computed risk measures associated with the nodes of the network. For example, a node may be selected and the link risk measures associated the communication links enabling access to the node may be evaluated to determine the node's computed risk measure. The traversal may then include selecting a neighboring node with which the node has a communication link and evaluating the neighboring node's respective link risk measures. The traversal may continue until the computed risk measures associated with all the nodes are determined.

FIG. 1 shows an example of an environment for evaluating a computed risk measure associated with a node of a network in accordance with at least one embodiment. In the environment 100, a network 102 comprising a plurality of nodes 104 (singularly referred to hereinafter as node 104) is shown. As described herein, a node 104 may be any type of computing system, such as a server, database or computing service, among others. Two nodes of the plurality of nodes 104 are shown to be connected via a communication link 106, whereby the communication link 106 may be a data path between the two nodes that enables one node to access the other node. The environment 100 also includes a link risk evaluation entity 108 and a node risk evaluation entity 110. The link risk evaluation entity 108 may be a computer system that is configured to determine a link risk measure associated with each communication link 106 in the network 102. The node risk evaluation entity 110 may also be a computer system that is configured to determine computed risk measure associated with each node 106 of the network 102.

The node risk evaluation entity 110 may receive the link risk measures determined by the link risk evaluation entity 108 and utilize some or all of the link risk measures to determine the computed risk measure associated with each node 106. As described herein, the computed risk measure associated with a node 104 may be a function (for example, an aggregate) of the link risk measures of the various communication links of the node. The node risk evaluation entity 110 may determine the computed risk measures associated with the nodes 104 of the network 102 periodically or according to an aperiodic time schedule. Furthermore, the computed risk measures may be utilized to pre-emptively deter attacks against the network 102.

Figure 2:
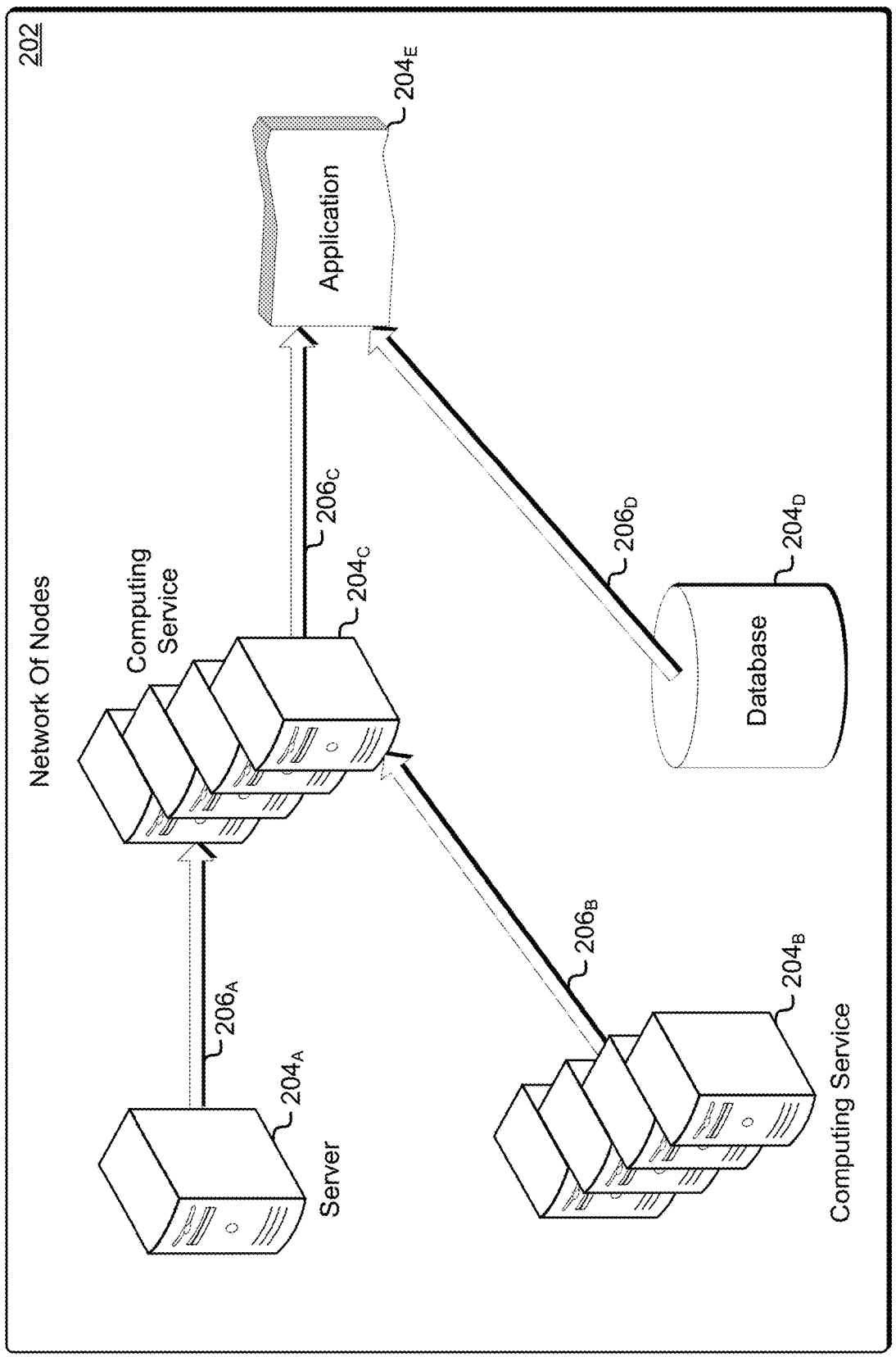
FIG. 2 shows an example of a network of nodes in accordance with at least one embodiment.

FIG. 2 shows an example of a network of nodes in accordance with at least one embodiment. The network of nodes 202 includes a plurality of nodes $204_{A-E}$ (singularly referred to herein as node 204 and collectively referred to herein after as plurality of nodes 204). The plurality of nodes 204 include a first node (referred to herein as first node $204_A$) that is a server, a second node (referred to herein as second node $204_B$) that is a computing service, a third node (referred to herein as third node $204_C$) that is another computing service, a fourth node (referred to herein as fourth node $204_D$) that is a database and a fifth node (referred to herein as fifth node $204_E$) that is an application, such as an application executed on a computer system or a server. Two nodes 204 of the plurality of nodes 204 are connected via a communication link 206. As shown in FIG. 2, the first node $204_A$ and the third node $204_C$ are connected via a first communication link $206_A$, the second node $204_B$ and the third node $204_C$ are connected via a second communication link $206_B$, the third node $204_C$ and the fifth node $204_E$ are connected via a third communication link $206_C$, the fourth node $204_D$ and the fifth node $204_E$ are connected via a fourth communication link $206_D$.

A node 204 may be any type of device or entity that is configured to communicate with another node 204 in the network of nodes 202 or outside of the network of nodes 202. The node 204 may be configured with computing resources that are used to perform computing functions. The computing resources may include computational resources, memory or storage resources or networking resources, among others. The computational resources may include a single-core or multi-core central processing unit (CPU) or a multi-threaded graphics processing unit (GPU), among others. Furthermore, the computational resources may include dedicated circuitry that is configured to perform computational operations, such as that provided by an encoder, a decoder or an application-specific integrated circuit (ASIC). The memory resources may include dynamic random access memory (DRAM) or static random access memory (RAM), among others. The storage resources may include a hard drive, solid state drive or flash drive, among others. Furthermore, the networking resources may include a network card or a modem, among other devices.

A node 204 may, for example, be a computing service that is remotely-hosted or off-premises in relation to a customer utilizing the computing service. Furthermore, the computing service may be accessible by the customer over a network, whereby the customer that is utilizing the computing resources of the computing service may be another node 204 in the network of nodes 204. The computing service may be used to provide computing functionality to other nodes 204 in the network 202. For example, the computing service may be a data storage service. The data storage service may be used to remotely store object-based or block-based data that is provided by another node 204. For example, if the third node $204_C$ is a data storage service, the server may utilize the first communication link $206_A$ to provide data to be persistently stored by the data storage service. Furthermore, the computing service may be a virtual computer system service that provisions virtual computer systems, whereby a virtual computer system may be used to host a web server or a mail server. As another example, the computing service may be a database service, a notification service or a queuing service, among others.

The node 204 may also be a server or a network device, such as a router or firewall, in the network of nodes 204. Furthermore, the node 204 may be any type of consumer electronics device, such as a laptop computer, a desktop computer, a smartphone or tablet. Further, the node 204 may be a data store. The node 204 may also be a database, such as the fourth node $204_D$ of the network of nodes 202, whereby the database may be a structured query language (SQL) database or a NoSQL database. The node may also be an application or software that is executed on a computer system or server, among others. For example, as shown in FIG. 2, the fifth node $204_E$ of the network of nodes 202 is an application executed on a server of the network.

The node 204 may be an input/output device, such as a port, network socket. In various embodiments, the node 204 may be configurable by an application or an operating system. For example, the node may be a socket that has an address and is configured to receive or send data pertaining to an application. A computer system may include a plurality of nodes, whereby the storage drive of the computer system may be first node, an application being executed on the computer system may be a second node and an input/output device may be a third node. The node 204 may be a physical device, such as a physical server, a hard disk, hard drive or solid state drive. Furthermore, the node 204 may be a virtual computing system that is instantiated utilizing underlying physical computing resources.

Two or more nodes 204 of the network 202 may be linked with one another. Linked nodes 204 may be nodes 204 that have a communication link 206 between one another. The communication link 206 may be used by a first node to send data to a second node or receive data from the second node. For example, the any type of unidirectional or bidirectional data exchange may take place over the communication link 206. The data may include may be a request, such as application programming interface (API) configured function call or web services request, or a response in accordance with any client-server communication model. Furthermore, nodes 204 may be linked if the flow of data between the nodes 204 is unidirectional or is bidirectional.

Two nodes 204 may be linked and a communication link 206 may exist between the two nodes 204 if a first node is permitted to send data to the second node or receive data from the second node even if the permission is not exercised or utilized for access. Access permissions may be associated with nodes 204 in the network 202, and an entity within the network 202 may be tasked with enforcing the access permissions. The access permissions may correspond to access privileges that specify a level of access enforced within the network 202. For example, the network 202 may be access-controlled and nodes 204 of the network 202 may have permission privileges that specify a type of access that may be granted to a node 204. One or more nodes 204 may be members of a group, whereby the group may be associated with a certain access permission that enables each node 204 in the group to access another node 204. A communication link 206 may exist between two nodes if there is a likelihood or potential for a unidirectional or bidirectional data exchange between the two nodes despite the fact that the nodes may not have been observed to exchange data.

Although the nodes 204 of network of nodes 202 are shown in FIG. 2 to form a complete graph, whereby a path traversing the communication links of network 202 may reach all nodes 204 of the network, in alternative embodiments separate and independent graphs may exist in the network 204. For example, the nodes 204 of the network 202 may not all be connected with one another (for example, to form a complete connectivity graph) or with another node outside the network 202, and the network 202 may have a plurality of graphs.

In the network of nodes 202, the plurality of nodes 204 communicate with one another over the communication links 206. Due to node connectivity, a compromised node 204 may negatively impact the remainder of the nodes 204 in the network 202 as well as the data stored, processed or otherwise handled by the nodes 204. For example, if a node 204 is compromised, data exfiltration may occur, whereby an attacker may obtain data stored by the node 204 and categorized as secretive or sensitive. Furthermore, the ability of a first node 204 to communicate with a second node 204 in the network 202 over a communication link 206 enables the first node 204 or a party controlling the first node 204 to interfere with the operation of the second node 204. For example, the first node 204 may send data that includes active content to the second node 204, whereby the active content may cause the second node 204 to malfunction once the active content is interpreted or processed by the second node 204. Furthermore, when the first node 204 is compromised and is permitted to request the performance of computational operations by the second node 204 (for example, through the submission of an application programming interface configured function call), the second node 204 may become compromised by virtue of the fact that it processes requests on behalf of the first node 204. Accordingly, due at least in part to the connectivity of the network of nodes 202, when a node 204 is compromised, other nodes 204 of the network 202 may become compromised as a result.

Each node 204 in the network 202 may be associated with a computed risk measure, whereby examples of the computed risk measure may include a risk score. The computed risk measure may indicate an estimated likelihood of compromise to the node (for example, data loss, exfiltration, theft or damage). Further, the computed risk measure may be indicative of a likelihood of a security breach of the node or compromise of the node by an attacker. In addition, the computed risk measure may be indicative of a severity of an impact of the compromise. For example, as the computed risk measure increases, an anticipated likelihood of a data theft affecting sensitive or secretive data increases. The computed risk measure may be indicative that the node may be used as a command and control node for an attack or for constant espionage. Furthermore, the computed risk measure may be indicative that the node is used for the elevation of privilege of one or more users.

The computed risk measure may be a function of the sensitivity or secrecy of the data, whereby the computed risk measure may be higher when the node 204 is used to store data that is categorized as secretive or sensitive than when the node 204 is not used to store data that is categorized as secretive or sensitive. If there are multiple levels of sensitivity or secrecy of the data, then the computed risk measure may increase as the level of sensitivity or secrecy of the data increases. Furthermore, the computed risk measure may be a function of the consolidation of data. For example, a node that stores a large volume of data may be associated with a higher computed risk measure than a node that stores a smaller volume of data. In addition, the computed risk measure may be a function of the number of nodes accessing the node 204 by, for example, providing data to the node 204 for storing, processing or routing, among others. The higher the number of nodes that access the node 204, the higher is the computed risk measure.

In addition, the computed risk measure associated with a node 204 may indicate a likelihood of compromise to the node 204 or the network of nodes 202. For example, the node 204 may be compromised if the node 204 is controlled by a party lacking authorization to control the node 204 (for example, an attacker) or if access to the node 204 is given to a party lacking authorization to access the node 204. Furthermore, the computed risk measure associated with the node 204 may be indicative of an impact to other nodes 204 or the network 202 as a whole if the node 204 were to be compromised. The computed risk measure associated with nodes 204 of the network 202 may be used to identify security vulnerabilities within the network 202 and prioritize the resolution of the security vulnerabilities. For example, the resources of administrators and technicians may be focused on addressing vulnerabilities in a node 204 that is associated with a higher computed risk measure than another node 204 with a lower computed risk measure.

Figure 3:
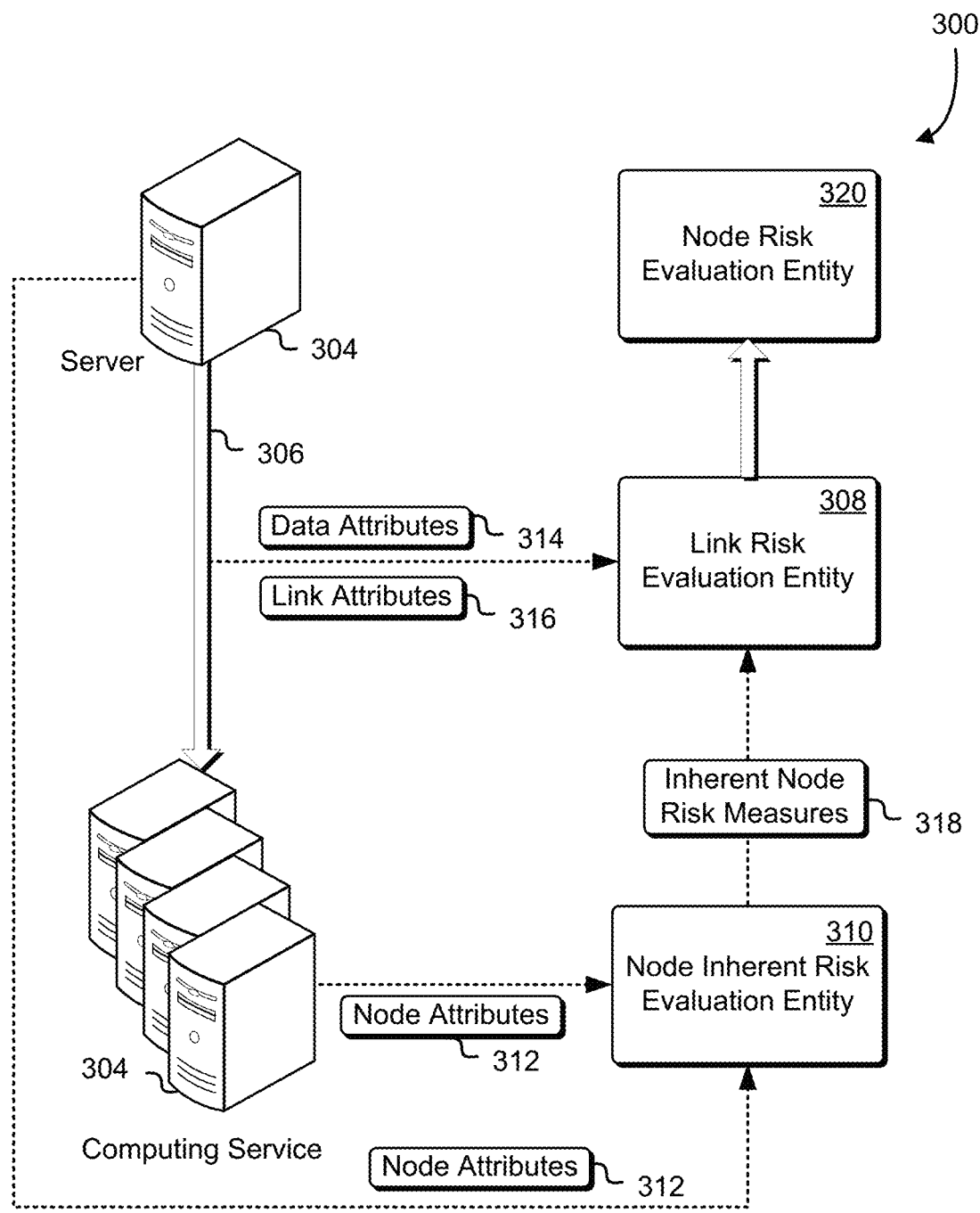
FIG. 3 shows an example of an environment for evaluating a risk measure associated with a communication link in accordance with at least one embodiment.

FIG. 3 shows an example of an environment for evaluating a risk measure associated with a communication link in accordance with at least one embodiment. In the environment 300, two nodes 304 are shown to have a unidirectional communication link 306. The nodes 304 and communication link $306_A$ correspond to the nodes $204_A$, $204_C$ and the communication link $206_A$, respectively, described with reference to FIG. 2. A link risk evaluation entity 308, a node inherent risk evaluation entity 310 and a node risk evaluation entity 320 are provided in the environment 300. The link risk evaluation entity 308 may be any type of entity configured to determine a risk measure associated with the communication link 306 between the nodes 204 as described herein. Furthermore, the node inherent risk evaluation entity 310 may be any type of entity configured to determine an inherent risk measure associated with the nodes 304. In addition, the node risk evaluation entity 320 may be any type of entity that is configured to utilize the risk measure associated with the communication link 306 in addition to other risk measures associated with other communication links of either node 304 to determine a computed risk measure associated with either node 304.

The node inherent risk evaluation entity 310 may receive from each node in a network, such as the network 202 described with reference to FIG. 2, one or more node attributes 312 of the node 304 and may determine, for each node 304, an inherent risk measure based at least in part on the evaluating the one or more node attributes 312 of the node 304. The one or more node attributes 312 may include the type or number of applications that run on the node 304. The one or more node attributes 312 may include the node's 304 enforced security policies. The node inherent risk evaluation entity 310 may determine an inherent risk measure for each node 304 based at least in part on the one or more node attributes 312 of the node 304. The inherent risk measure may be indicative of a risk associated with the node 304, whereby the risk represented by the inherent risk measure may be attributable to the node 304 and not the communication link 306 the node 304 has with other nodes in the network. The inherent risk measure of a node may be determined based at least in part on applications executed on the node or data stored by the node. Further, the inherent risk measure of the node may be determined based at least in part on a party accessing the node or an environment in which the node operates. For example, the inherent risk measure of the node may be based at least in part on static attributes of the node rather than connectivity of the node, which is accounted for by the computed node risk measure.

The communication link 306 may also be associated with a link risk measure. The link risk measure may be based at least in part on one or more attributes of the data 314 traversing the link and one or more attributes of the link 316. The one or more attributes of the link 316 may include the access permissions required for access to be performed over the communication link 306. Furthermore, the one or more attributes of the link 316 may include the type of access that one node 304 may be granted to another node 304 over the link 306. For example, the type of access may vary, whereby the access may be restricted and only a small number of actions may be permitted or the access may be broad.

The one or more attributes of the data 314 may include the type of data that is trafficked over the link and whether the data is categorized as secretive or sensitive. The one or more attributes of the link 316 may be used to determine a link type risk measure, and the one or more attributes of the data 314 may be used to determine a data type risk measure. The link risk evaluation entity 308 may determine the link type risk measure based at least in part on the one or more attributes of the link 316 and the data type risk measure based at least in part on the one or more attributes of the data 314. Furthermore, the link risk evaluation entity 308 may receive inherent node risk measure 318 of each node 304 from the node inherent risk evaluation entity 310, whereby the communication link 306 may be a path between the nodes 304. The link risk evaluation entity 308 may then determine a risk measure for the communication link based at least in part on the received risk measures. The risk measure for the communication link may be calculated as:

$$LR_{i,j} = a \cdot IR_i + b \cdot IR_j + c \cdot R_D + d \cdot R_L \qquad \text{Equation (1)}$$

where $LR_{i,j}$ is the risk measure for a unidirectional communication link between a node having the index i and a node having the index j. The node having the first index, i, signifies access by the node to a second node having the index, j. Further, $IR_i$ and $IR_j$ are the inherent risk measures for nodes i and j, respectively, and $R_D$ and $R_L$ are the data type risk measure and the link type risk measure, respectively. In addition, a, b, c, and d are weights that may be changed to adjust the contribution of the component risk measures to the risk measure of the communication link, $LR_{i,j}$.

The risk measure of the communication link is provided to the node risk evaluation entity 320 for use in determining a computed node risk measure as described with reference to FIG. 4 herein. For example, the computed node risk measure may be a function of the risk measure of the communication link as well as other risk measures of communication links of the node. It is noted that although one communication link is shown in FIG. 3, the risk measure may be computed for all the communication links of a network of nodes, such as the network of nodes 202 described with reference to FIG. 2.

Figure 4:
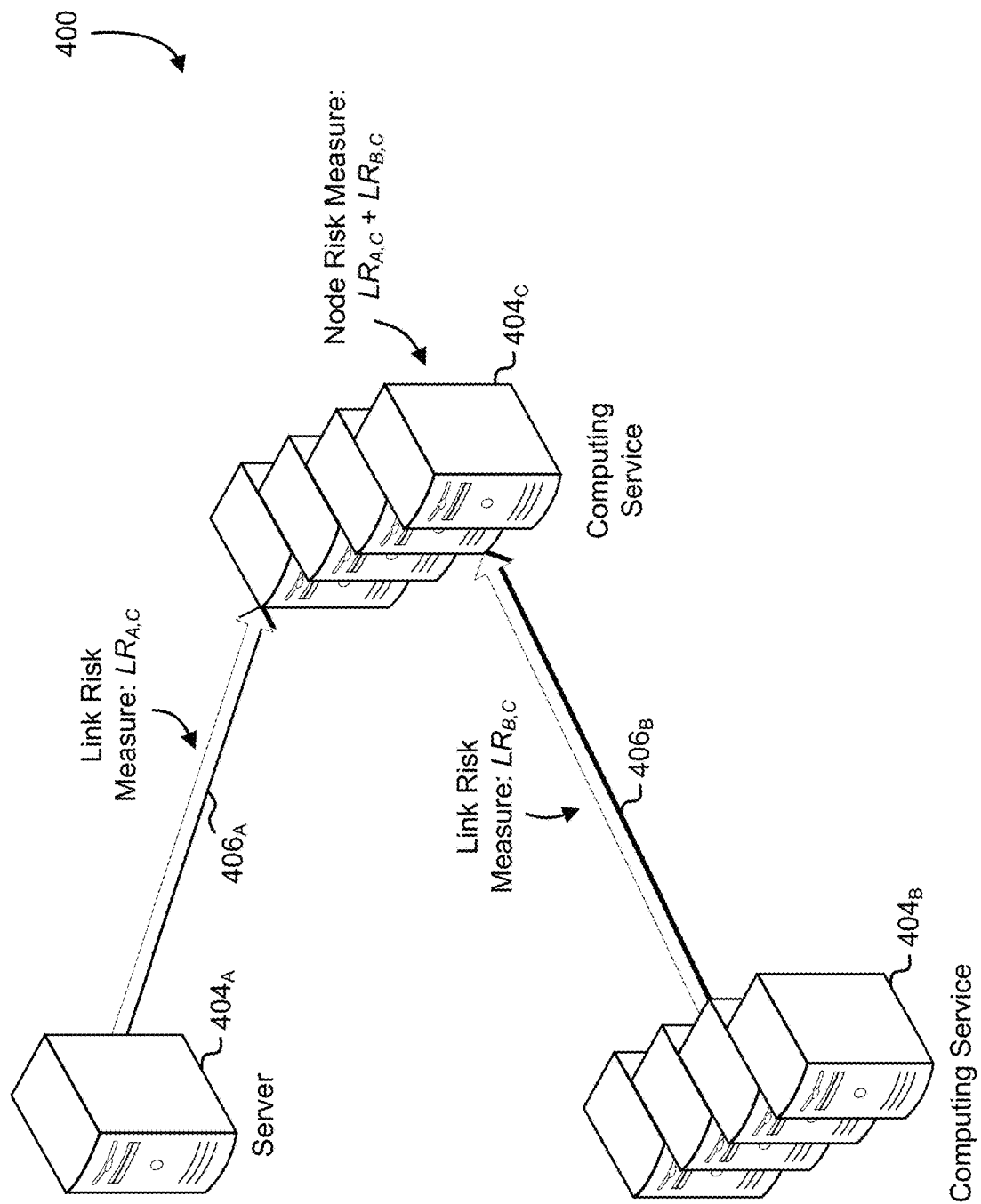
FIG. 4 shows an example of an environment for determining a computed node risk measure in accordance with at least one embodiment.

FIG. 4 shows an example of an environment for determining a computed risk measure in accordance with at least one embodiment. In the environment 400, a plurality of nodes $404_{A-C}$ comprising a first node $404_A$, a second node $404_B$ and a third node $404_C$ are shown. The plurality of nodes $404_{A-C}$ are similar to nodes $204_{A-C}$ described with reference to FIG. 2. The first node $404_A$ and the third node $404_C$ have a first communication link $406_A$, whereby the first communication link $406_A$ is a unidirectional communication link that enables the first node $404_A$ to access the third node $404_C$. For example, the access may permit the first node $404_A$ to submit application programming interface function calls to the third node $404_C$ or send data for storage by the third node $404_C$. Furthermore, the second node $404_B$ and the third node $404_C$ have a second communication link $406_B$, whereby the second communication link $406_B$ is a unidirectional communication link that enables the second node $404_A$ to access the third node $404_C$.

The first communication link $406_A$ is associated with a first link risk measure, $LR_{A,C}$, and second communication link $406_B$ is associated with a second link risk measure, $LR_{B,C}$. The computed risk measure associated with the third node $404_C$ may be determined as a function (for example, sum) of the link risk measures of the communication links $406_A$, $406_B$ pertaining to the third node $404_C$. Because the first node $404_A$ and the second node $404_B$ both access the third node $404_C$, the computed risk measure associated with the third node $404_C$ is a function of the link risk measures of the communication links $406_A$, $406_B$ of the first node $404_A$ and the second node $404_B$. Although two communication links $406_A$, $406_B$ are shown in the environment 400 of FIG. 4, a node may have any number of communication links with other nodes in a network. The computed risk measure may be generally determined as a function of the link risk measures associated with the node. Furthermore, the link risk measures may pertain to communication links of nodes accessing the node.

The computed risk measure may be calculated as:

$$R_j = f(LR_{1,j}, LR_{2,j}, \ldots, LR_{n,j}) \qquad \text{Equation (2)}$$

where $R_j$ is the computed risk measure of a node having the index 'j' and $LR_{i,j}$ is the risk measure of a communication link between the a node having the index 'i' and the node. Furthermore, n is the number of nodes having communication links with the node and (.) is any function. It is noted that in various embodiments, the node's computed risk measure may be determined based at least in part on some but not all of the risk measures associated with the communication links of the node.

The function may be any type of statistical function, such as a summation, mean, median, minimum, or maximum, among others. The function may further be any type of mathematical function, such as an exponential function or product function. Furthermore, the function may be a weighted function, whereby the contributions of the components of the function may be weighted. In addition, the function may be a scoring function based at least in part on thresholds (also referred to as bucketing). For example, if a resultant output falls within a range, the risk measure may be assigned a particular score that is different than another resultant output that falls within a different range.

The node computed risk measure may be an aggregate of link risk measures. Furthermore, the aggregate may be weighted, whereby the node computed risk measure may be calculated as:

$$R_j = \sum_{i=1}^{n} \omega_{i,j} LR_{i,j} \qquad \text{Equation (3)}$$

where $R_j$ is the computed risk measure of a node having the index 'j', $LR_{i,j}$ is the risk measure of a communication link between the a node having the index 'i' and the node, and $\omega_{i,j}$ is a weight associated with the communication link, whereby the weight, $\omega_{i,j}$, may be any number. Furthermore, n is the number of nodes having communication links with the node.

It is noted that in various embodiments, the risk measure of a communication link is dependent on the directionality of the communication link. For example, the risk measure of the second communication link $406_B$, $LR_{B,C}$, is pertinent to the second communication link $406_B$ as a unidirectional between the second node $404_B$ and the third node $404_C$ that provides the second node $404_B$ with access to the third node $404_C$. Reversing the direction of the communication link $406_B$ may result in a different link risk measure than $LR_{B,C}$. For example, the reverse communication link permitting the third node $404_C$ access to the second node $404_B$ may be denoted as $LR_{C,B}$ and may be different than $LR_{B,C}$. The reverse communication link risk measure, $LR_{C,B}$, may contribute to the determination of the computed risk measure of the second node $404_B$. For example, reverse communication link risk measure, $LR_{C,B}$, may be aggregated together with other risk measures of communication links through which access to the second node $404_B$ is obtained. The aggregate may be the computed risk measure of the second node $404_B$.

In various embodiments, the communication links of a network of nodes, such as the network of nodes 202 described with reference to FIG. 2 may be traversed to evaluate the computed risk measures of the nodes of the network 202. The communication links of the network may be traversed beginning with a layer of the network and proceeding along the communication links of the network. Upon reaching a node of the network, the computed risk measure of the node may be determined based at least in part on the risk measures of the communication links of the node. The communication links used to obtain the computed risk measure of the node may all have the same direction, whereby the communication links may permit other nodes of the network access to the node for which the computed risk measure is sought to be obtained.

Figure 5:
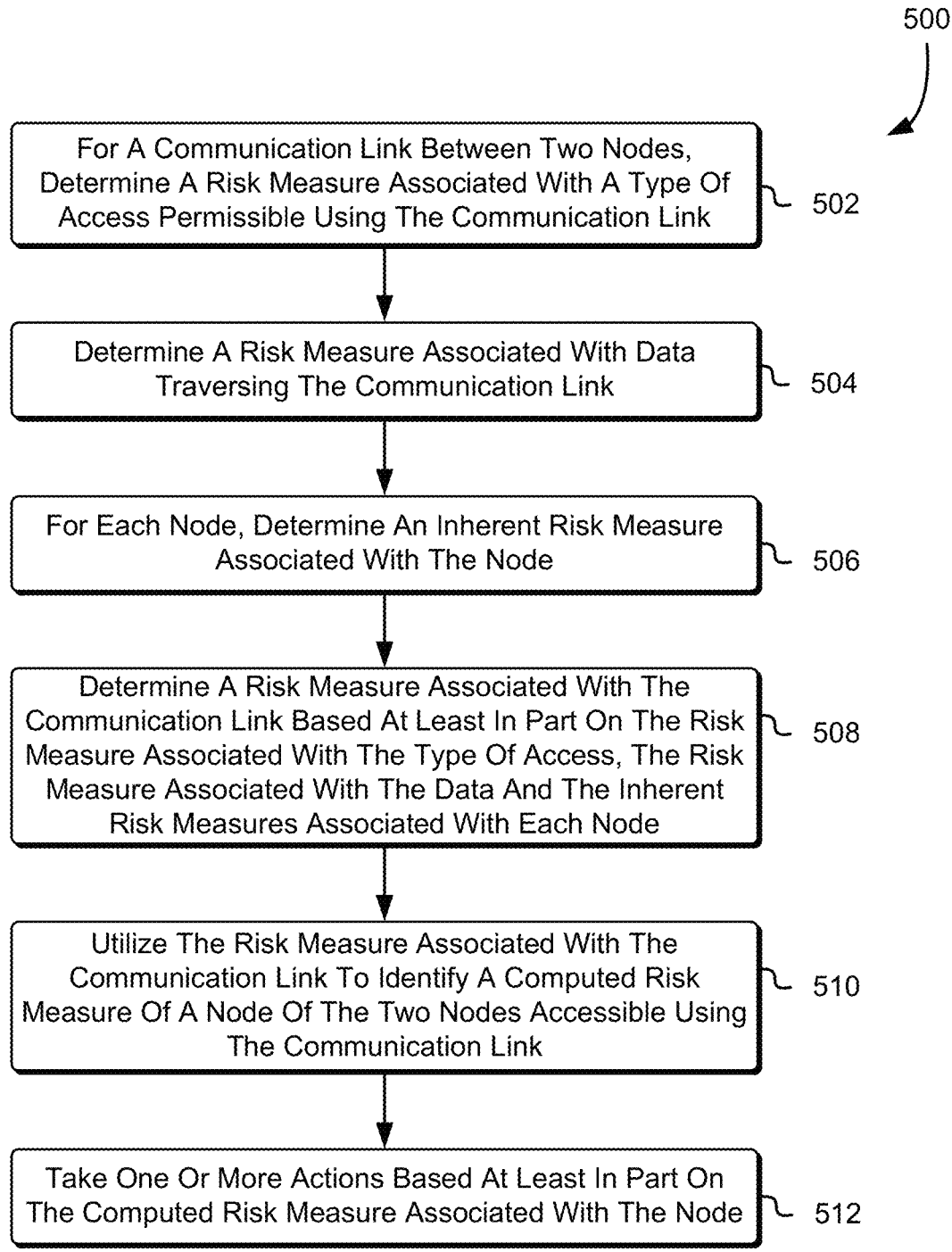
FIG. 5 shows an example of a method for determining a computed risk measure associated with a node in accordance with at least one embodiment.

FIG. 5 shows an example of a method for determining a computed risk measure associated with a node in accordance with at least one embodiment. In the process 500, a link risk evaluation entity, such as the link risk evaluation entity described with reference to numeral 308 in FIG. 3, determines 502 a risk measure associated with a type of access permissible using the communication link. The risk measure may be determined for each communication link for in a network of nodes. Furthermore, each communication link may be associated with two risk measures associated with the type of access that depend upon the direction of access using the communication link and whether the communication link is used by a first node to access a second node or vice-versa. The link risk evaluation entity also determines 504 a risk measure associated with data traversing the communication link. For example, the risk measure associated with data traversing the communication link may be higher for data categorized as secretive than it is for data that is not categorized as secretive.

A node inherent risk evaluation entity or another entity may then determine 506 an inherent risk measure associated with each node of the communication link. The inherent risk measure for a node may be determined based at least in part on a survey of an entity, such as an organization or an administrator thereof, that utilizes the node. For example, the type of application executed on the node, the type of data processed or handled by the node, the number or access privilege associated with users that access the node or the security mechanisms enforced by the node may be utilized to determine an inherent risk measure associated with the node. Factors utilized to determine the inherent risk measure may exclude risk taken on by the node as a result of the node being accessible by another node over a communication link or vice-versa. That is due to the fact that such risk is accounted for in the computed risk measure of the node as described herein.

The link risk evaluation entity then determines 508 a risk measure associated with the communication link based at least in part on the risk measure associated with the type of access, the risk measure associated with the data and the inherent risk measures associated with each node. The risk measures may be used to determine the risk measure associated with the communication link. For example, equation (1) described herein may be used to calculate the risk measure associated with the communication link. The link risk evaluation entity then utilizes 510 the risk measure associated with the communication link to identify a computed risk measure of a node accessible using the communication link. The risk measure associated with the communication link may be used with other risk measures associated with other communication links used to access the node for determining the computed risk measure of the node. An entity monitoring the computed risk measures of nodes in the network may then take 512 one or more actions based at least in part on the computed risk measure of the node. For example, if the calculated risk measure of the node exceeds a threshold, an administrator may be notified (e.g., by sending an email).

The node may be assessed to determine whether the node presents a risk to the network. In addition, if nodes in the network belong to different customers of a computing resource provider, the customer for which the node is provisioned may be altered. Furthermore, if the calculated risk measure of the node exceeds a threshold, the establishment of further communication links with the node that further contribute to the computed risk measure associated with the node may be ceased or prohibited. For example, an entity of a network may retain (for example, in a database) a list of nodes that are prohibited from further establishment of communication links. If further link establishment is to be prohibited, an identity of the node may be added to the list. The list may be consulted prior to each link establishment in the network to determine whether the establishment of the link is permissible. In addition, the type of data or type of connection established with the node may be validated or only a restricted set of connections may be permitted for the node.

The actions may also include storing the computed risk measure and vending sending the computed risk measure to an administrator of the node. Furthermore, the computed risk measure may be determined periodically or according to an aperiodic schedule. Various versions of the computed risk measure may be stored and tracked over time. For example, a version store of the computed risk measure may be maintained and used to deter compromise to the node.

Figure 6:
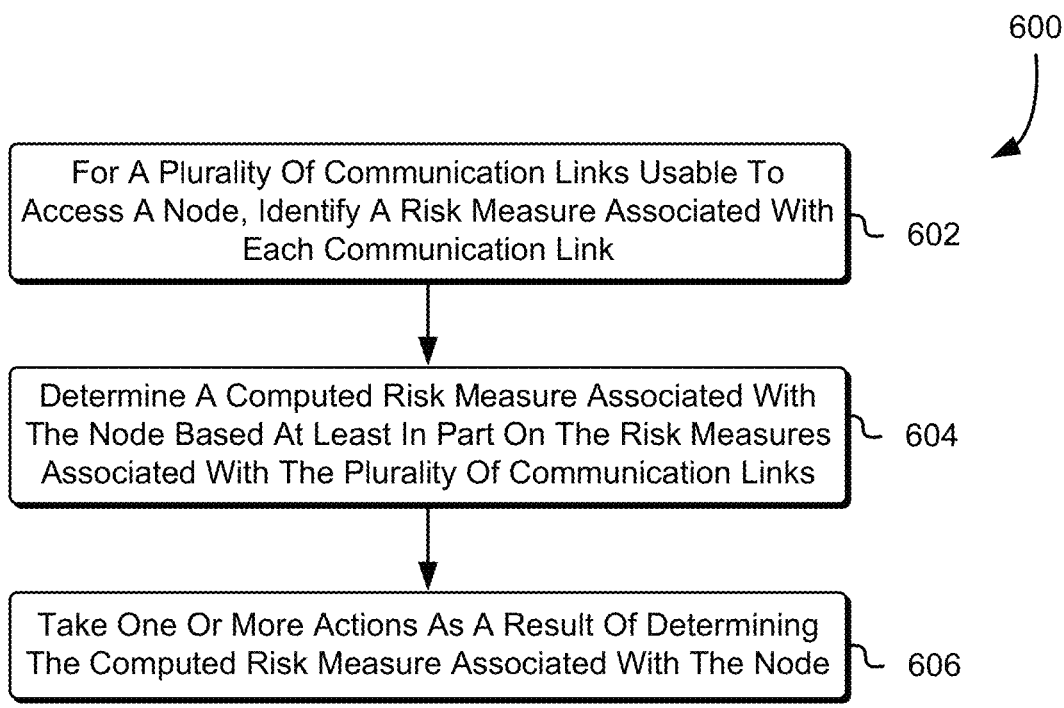
FIG. 6 shows an example of a method for determining a computed risk measure associated with a node in accordance with at least one embodiment.

FIG. 6 shows an example of a method for determining a computed risk measure associated with a node in accordance with at least one embodiment. In the process 600, a link risk evaluation entity, such as the link risk evaluation entity described with reference to numeral 308 in FIG. 3, identifies 602 a risk measure associated with each communication link of a plurality of communication links usable to access a node. For example, the risk measures associated with the plurality of communication links may be determined using equation (1) as described herein. The risk measure associated with a communication link may be based at least in part on the risk measure associated with the type of access permitted using the communication, the risk measure associated with the data traversing the communication link and the inherent risk measures of each node utilizing the communication link.

The link risk evaluation entity then determines 604 a computed risk measure associated with the node based at least in part on the risk measures associated with the plurality of communication links. As described herein, the computed risk measure of the node may be a weighted sum of the risk measure of all communication links used to access the node. The computed risk measure may be calculated using equation (2) as described herein. The link risk evaluation entity then takes 606 one or more actions as a result of determining the risk measure associated with the node. The actions may include notifying an administrator of the node that the risk measure of the node exceeded a threshold or prohibiting the establishment of further communication links with the node.

It is noted that in various embodiments, a node may be a cluster (for example, a subnet) of component nodes. Various other nodes or other clusters may have communication links with the cluster of nodes and the computed risk measure may be evaluated for the cluster as a whole. Accordingly, a node as described herein may be a collection of connected computing resources for which a computed risk measure may be calculated.

Figure 7:
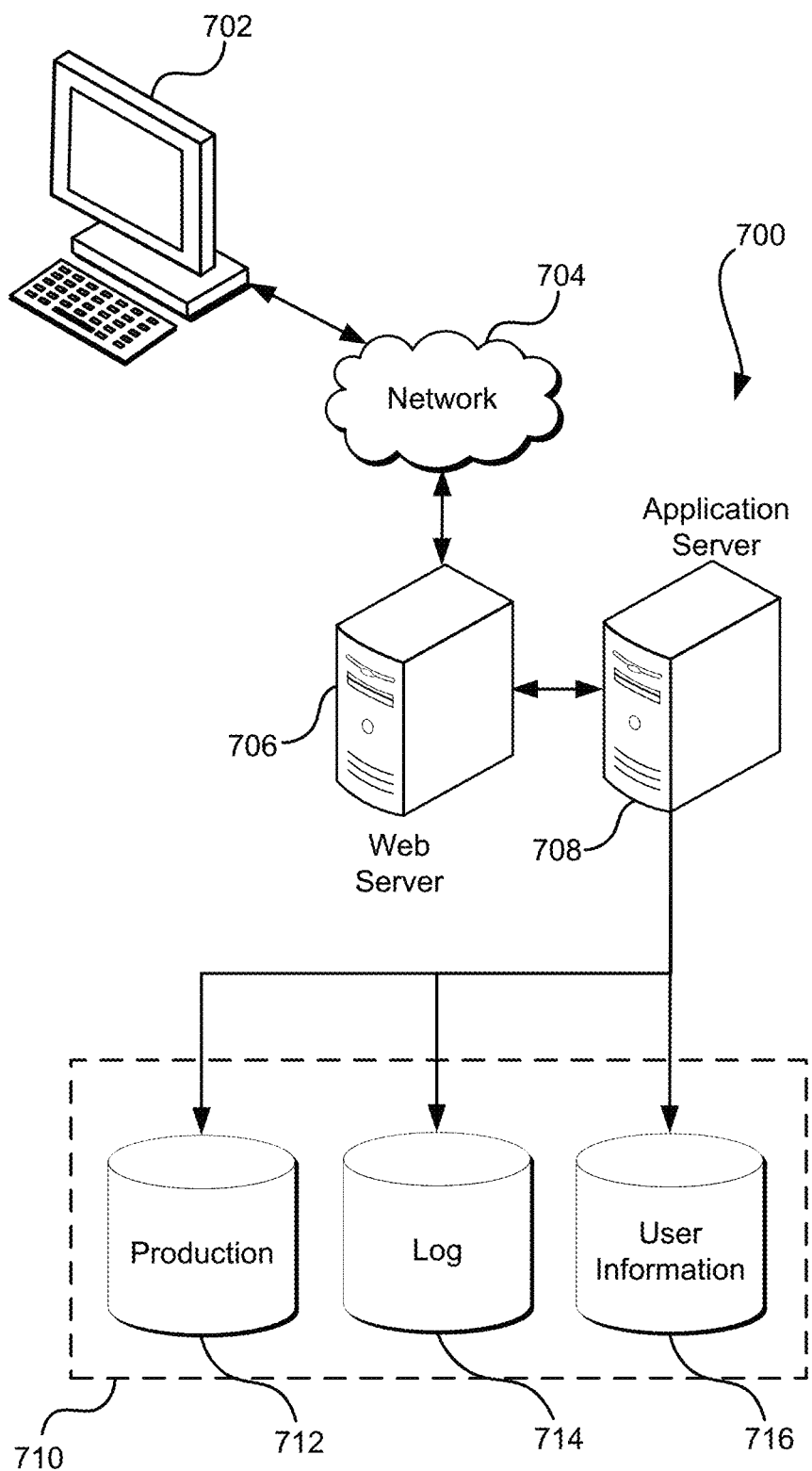
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
for a network comprising a plurality of communication links between a first node and a plurality of nodes, obtaining a plurality of link risk measures corresponding to the plurality of communication links by, for each communication link of the plurality of communication links:
determining a first risk measure of the communication link, the first risk measure being associated with a type of access to the first node permissible using the communication link, the type of access associated with a set of permissions that a corresponding node of the plurality of nodes has to the first node over the communication link;
determining a second risk measure of the communication link, the second risk measure being associated with a set of attributes, the set of attributes:
being associated with data that is transmitted between the first node and the corresponding node via the communication link; and
indicating a type of the data and a sensitivity of the data;
determining a first inherent node risk measure associated with the first node and a second inherent node risk measure associated with the corresponding node; and
obtaining a link risk measure of the communication link based at least in part on:
the first risk measure;
the second risk measure;
the first inherent node risk measure; and
the second inherent node risk measure;
computing an overall risk measure associated with the first node based at least in part on the plurality of link risk measures, the overall risk measure indicating an amount of risk of a security breach of the first node or data exfiltration from the first node; and
taking one or more actions as a result of the overall risk measure exceeding a threshold.

2. The computer-implemented method of claim 1, wherein the one or more actions include at least one of:
ceasing establishment of further communication links with the first node,
validating data exchanged with the first node, or
sending an alert to an administrator of the network indicating that the overall risk measure associated with the first node exceeded the threshold.

3. The computer-implemented method of claim 1, wherein the set of permissions correspond to one or more access privileges that the corresponding node has to the first node.

4. A system, comprising one or more processors and memory including executable instructions that, if executed by the one or more processors, cause the system to implement one or more services, wherein the one or more services at least:
determine, for a first node that is connected with a second node of a plurality of nodes using a communication link of a plurality of communication links, a plurality of link risk measures, the plurality of link risk measures including:
a first link risk measure of the communication link, the first link risk measure associated with an access type associated with a set of permissions that the second node has to the first node over the communication link; and
a second link risk measure of the communication link, the second link risk measure associated with a set of attributes, the set of attributes:
being associated with data transmitted between the first node and the second node via the communication link; and
indicating a type of the data and a sensitivity of the data;
determine an overall risk measure associated with the first node based at least in part on the plurality of link risk measures, the overall risk measure representing an amount of risk of a security breach of the first node or data exfiltration from the first node; and
cause the overall risk measure associated with the first node to be sent to be evaluated.

5. The system of claim 4, wherein the one or more services that cause the overall risk measure associated to be sent to be evaluated further cause the overall risk measure to be provided to an administrator of the first node to determine whether to perform one or more actions based at least in part on evaluating the overall risk measure.

6. The system of claim 4, wherein the plurality of link risk measures further include at least one of:
a first inherent risk measure associated with the first node, or
a second inherent risk measure associated with the second node.

7. The system of claim 6, wherein the amount of risk indicates a likelihood of a security compromise of the first node.

8. The system of claim 4, wherein the one or more services further store the overall risk measure associated with the first node.

9. The system of claim 8, wherein:
the one or more services that store the overall risk measure associated with the first node further store a plurality of versions of risk measures; and
a version of the plurality of versions is updated by another version of the plurality of versions as a result of a change to the overall risk measure.

10. The system of claim 4, wherein the first node comprises a first cluster of connected computing nodes and the overall risk measure associated with the first node represents a measure of risk of the first cluster of connected computing nodes.

11. A non-transitory computer-readable storage medium having stored thereon executable instructions that, as a result of execution by one or more processors of a computer system, cause the computer system to at least:
identify a plurality of communication links in a network, a communication link of the plurality of communication links being used to transfer data between a first node a second node of a plurality of nodes;
identify a plurality of link risk measures associated with the plurality of communication links, the communication link being associated with a first link risk measure and a second link risk measure of the plurality of link risk measures, wherein:
the first link risk measure of the communication link indicates a risk of compromise to the first node, the risk of compromise being based at least in part on a set of permissions that the second node of the plurality of nodes has to the first node; and
the second link risk measure of the communication link is associated with a set of attributes, the set of attributes:

being associated with data that is transmitted between the first node and the second node; and
indicating a type of the data and a sensitivity of the data;

determine, based at least in part on the plurality of link risk measures, an overall risk measure associated with the first node; and perform one or more actions as a result of determining the overall risk measure associated with the first node.

12. The non-transitory computer-readable storage medium of claim 11, wherein the executable instructions that cause the computer system to take the one or more actions further include instructions that further cause the computer system to audit log entries associated with the first node on a condition that the overall risk measure is within a range of risk measures.

13. The non-transitory computer-readable storage medium of claim 11, wherein the second link risk measure is based at least in part on at least one of:
a number of applications executed on the first node,
a number of applications executed on the second node,
a type of application executed on the first node, or
a type of application executed on the second node.

14. The non-transitory computer-readable storage medium of claim 11, wherein the executable instructions that cause the computer system to take the one or more actions further include instructions that further cause the computer system to cease establishment of further communication links with the first node.

15. The non-transitory computer-readable storage medium of claim 11, wherein the second node is:
a server,
data store,
computing service, or
subnet of computing nodes.

16. The non-transitory computer-readable storage medium of claim 11, wherein the second link risk measure of the plurality of link risk measures is based at least in part on an access privilege associated with the second node, the access privilege indicating a level of access that the second node has to the first node.

17. The non-transitory computer-readable storage medium of claim 11, wherein:
the executable instructions that cause the computer system to determine the overall risk measure associated with the first node further include instructions that further cause the computer system to determine the overall risk measure periodically or according to a time schedule; and
the executable instructions further comprise instructions that further cause the computer system to store a plurality of versions of risk measures, the overall risk measure determined being stored as version of the plurality of versions.

18. The system of claim 4, wherein the first node uses the communication link to send application programming interface calls to the second node.

19. The non-transitory computer-readable storage medium of claim 11, wherein the flow of data between the first node and the second node over the communication link is unidirectional.

20. The non-transitory computer-readable storage medium of claim 11, wherein the executable instructions that cause the computer system to cause the computer system to take the one or more actions further include instructions that further cause the computer system to terminate an existing communication link of the first node.

* * * * *